Feb. 3, 1970    H. R. KESTNER ET AL    3,493,718
SEMI-CONDUCTOR WELDING CIRCUIT
Filed Oct. 15, 1968

Inventors:
Harold R. Kestner
John P. Gorman
by Ernest W. Legner
Their Attorney

United States Patent Office 3,493,718
Patented Feb. 3, 1970

3,493,718
SEMI-CONDUCTOR WELDING CIRCUIT
Harold R. Kestner, Lyndhurst, and John P. Gorman, Mentor, Ohio, assignors to General Electric Company, a corporation of New York
Filed Oct. 15, 1968, Ser. No. 767,793
Int. Cl. B23k 9/10
U.S. Cl. 219—131                                3 Claims

ABSTRACT OF THE DISCLOSURE

A weld ignitor circuit for ionizing the weld gap at each cycle in order to assure current flow from the welding power supply. The circuit comprises a semi-conductor controlled rectifier, a pulse capacitor and a pulse transformer connected in a modulator network wherein the SCR is pulsed by a gate circuit at a frequency approximating the natural oscillatory frequency of the network. This permits high current gating of the SCR without overloading the gating circuit and reduces the circuit requirements by permitting an oscillatory discharge of the pulse capacitor to achieve a cumulative ionization of the weld gap.

BACKGROUND OF THE INVENTION

The circuit is intended primarily for use in lamp manufacture to weld lead wires to lamp terminals, for instance the lead wires to the base pins of fluorescent lamps. Past practice has been to use a welding power supply comprising a thyratron current controller which determines the energy fed to the weld gap, and a high-voltage radio-frequency oscillator as a weld ignitor to initiate the arc. The RF oscillator is a high voltage (10 kilovolt) high frequency (6 megacycle) oscillator having its tank circuit connected in series with the welding power supply across the weld gap. The voltage generated by the oscillator is in series with that of the welding supply and assures ionization of the gap at each cycle.

While a radio-frequency oscillatory makes an excellent gap ionizing device, its operating characteristics present problems. The high frequency of operation makes the output voltage level particularly sensitive to the capacitive loading represented by the lead wires connected to the welding head. The problem may be minimized by keeping the lead length short but this generally results in placing the unit in a dusty environment subject to high temperatures to the unit's detriment. In addition the unit must be strictly monitored and regulated to guard against excessive radiation causing radio noise and interference.

The object of the invention is to provide an improved weld gap ignitor circuit avoiding the foregoing disadvantages.

SUMMARY OF THE INVENTION

Our invention provides a weld ignitor utilizing a semiconductor controlled rectifier pulse modulator to generate a series of pulses during the rise time of the A.C. voltage supplied by the current controller of the welding power supply. The pulse modulator is an oscillatory network comprising a pulse capacitor, the primary of a pulse transformer, and a silicon controlled rectifier connected in a closed loop. The pulse transformer has a secondary which is connected in series with the output circuit of the welding power supply across the weld gap. A diode or simple rectifier is connected in parallel with the controlled rectifier but poled to conduct in the opposite direction. Starting with the rise time of the A.C. voltage supplied by the current controller of the welding power supply, a gating circuit supplies pulses to the controlled rectifier at a frequency approximating the natural oscillatory frequency of the pulse modulator network. Gating of the controlled rectifier starts current flow from the pulse capacitor for the first pulse which is positive-going; the parallel diode allows reverse current flow to the pulse capacitor for the second pulse which is negative-going; gating of the controlled rectifier allows current flow for the third pulse which is positive-going like the first. The probability of welding current initiation by the first pulse is about 50%. If initiation does not occur with the first pulse, it is unlikely to occur with the second pulse because gap current flow from the second pulse opposes weld current. The second pulse does contribute to gap ionization, however, and the third pulse which is in the same direction as the first, will initiate ionization in all cases where the first pulse failed.

The combination of a gate circuit pulsed at a frequency approximating the natural oscillatory frequency of the modulator network permits high current gating of the controlled rectifier without thermal overloading of the gate junction. In addition by allowing an oscillatory discharge of the pulse capacitor and cumulative ionization of the weld gap during successive half cycles, the power handling requirements of the pulse transformer are sharply reduced.

DESCRIPTION OF PREFERRED EMBODIMENTS

Figure 1:
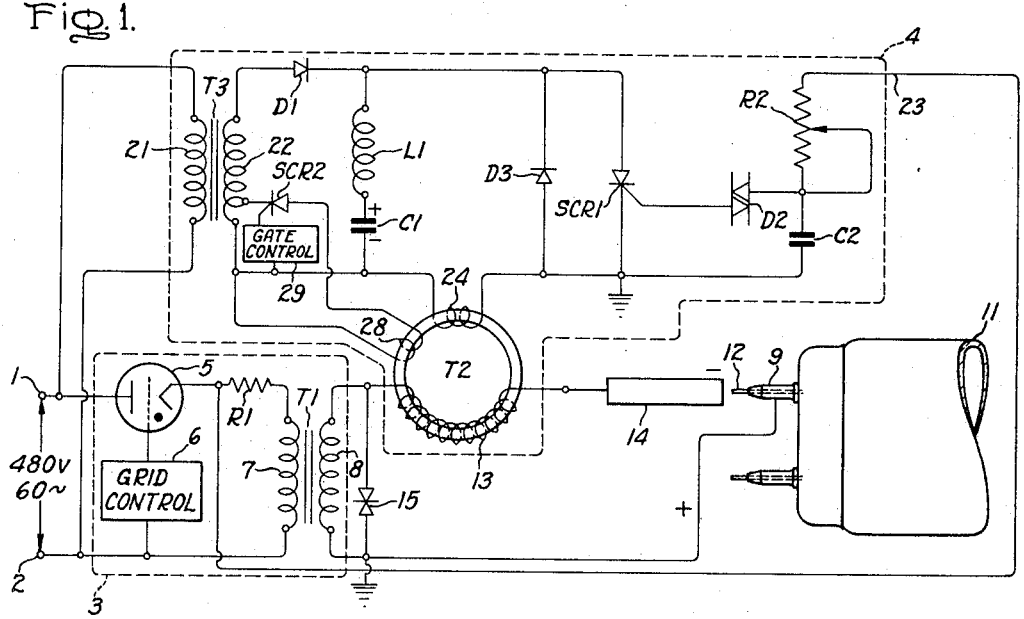
FIG. 1 is a schematic circuit diagram of a welding system including a weld ignitor embodying the invention.

Referring to FIG. 1, the welding system is energized from a 480-volt, 60 cycle A.C. supply at terminals 1, 2. Both the welding current controller shown enclosed within dotted rectangle 3 and the weld ignitor circuit shown enclosed within dotted rectangle 4 are energized from the same source in order to maintain necessary phase relations between the voltages affecting the system. Controller 3 is a commercially available unit comprising a thyratron 5, that is a gaseous rectifier having a control electrode or grid whose instant of firing in the half cycle can be shifted in a known way to regulate the welding current. A conventional control circuit for regulating the current by varying the firing instant is represented by the rectangle 6 labelled grid control.

Figure 2:
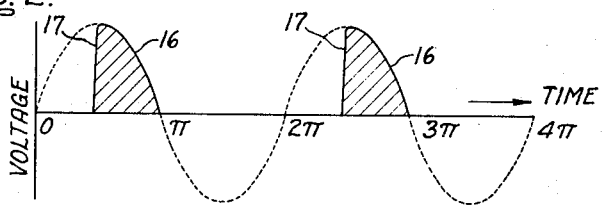
FIG. 2 shows the output voltage waveform of the current controller on a time trace showing several cycles of the A.C. supply.

The output of the thyratron is supplied through series resistor R1 to the primary 7 of welding transformer T1. The secondary 8 of the welding transformer is grounded on the side that engages the terminal or part to be welded. As illustrated in the drawing, the terminal is a tubular base pin 9 of a fluorescent lamp whereof a fragment 11 is illustrated; a short length of inlead wire 12 projects through the bore of the pin and a weld of the inlead to the tip of the pin is desired. The other side of the welding transformer is connected through secondary 13 of pulse transformer T2 to welding electrode 14. In a representative unit, the welding transformer may be a 480 to 240 volt unit of 7.5 kva. rating of which the output current is limited to about 200 amperes by saturation. A thyrector 15, which is a compact non-linear resistor whose resistance decreases as the voltage applied across it increases, is connected across the secondary of the welding transformer as a surge voltage suppressor. The output voltage of the controller in the middle of its current range consists of delayed half cycles 16 as shown in FIG. 2 with a rise or leading edge 17 extending over a relatively short time interval. After the weld gap is ionized and welding current has started to flow, the voltage waveform is of course rounded off and reduced in amplitude.

In the weld ignitor circuit, the A.C. voltage of 480 volts applied across primary 21 of transformer T3 is reduced to 240 volts across secondary 22 and charges pulse capacitor C1 through diode rectifier D1 and inductor L1 during the positive half cycle with the polarity indicated in the drawing which will be referred to as positive. On the subsequent negative half cycle, a gating voltage corresponding to rise 17 in the controller output voltage is applied to terminal 23 of the weld ignitor circuit relative to ground. The 180° outphasing of the weld ignitor circuit relative to the welding current controller can be accomplished by suitable poling of transformers T1 and T3. The gating voltage at terminal 23 causes capacitor C2 to charge at a rate governed by resistor R2 which is in the form of an adjustable potentiometer. The junction of C2 and R2 is connected through the diac D2 to the gate of semiconductor controller rectifier SCR1. A diac is a semi-conductor device whose impedance suddenly drops to a low value when the voltage applied across it exceeds a certain level. When the voltage across capacitor C2 reaches the breakdown voltage of diac D2, the latter breaks down and discharges capacitor C2 into the gate of controlled rectifier SCR1 which is thereby turned on.

Figure 3:
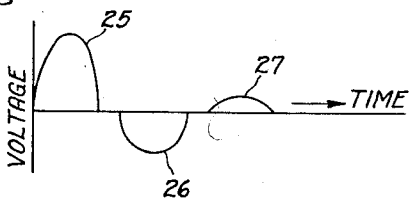
FIG. 3 shows the current pulses from the weld ignitor on a greatly expanded time trace.

When SCR1 is turned on, it begins to discharge capacitor C1 through the circuit loop comprising inductor L1, controlled rectifier SCR1, and primary 24 of pulse transformer T2. Inductor L1 is a saturating inductance and it serves to limit the current flow during the first few microseconds after controlled rectifier SCR1 is turned on in order to give it time to become completely active and avoid damage to the device by too rapid rise in current. However L1 is not essential and the circuit could operate without it. Inductance L1 then saturates and allows full current flow through SCR1, so that the voltage across C1 is applied in full across primary 24 of transformer T2. The current flow through primary 24 causes a 10 microsecond pulse to be developed across secondary 13 whereupon the core saturates. This current pulse is the first and is represented at 25 in FIG. 3. The energy remaining in the circut, primarily inductive energy from current flow through L1, then charges capacitor C1 in the opposite direction, that is negatively in a direction making the polarity opposite to that shown in FIG. 1. The current flow for the reverse charging of capacitor C1 is through diode D3 which by-passes controlled rectifier SCR1. As in the first half wave of oscillation, inductance L1 initially limits current flow then saturates allowing transformer T2 to generate a second pulse 26 which is of opposite polarity, that is negative when the first is positive. The core of transformer T2 then saturates and the remaining energy recharges capacitor C1 in the opposite direction, that is positively and in the same direction as the original charge.

The positive charge remains on pulse capacitor C1 until another pulse from the gating network turns on controlled rectifier SCR1 whereupon a third current pulse occurs. The action of the circuit is essentially the same as in the case of the first pulse except that voltage and current are both lower due to the energy loss in the previous oscillations.

While current will flow in the primary of pulse transformer T2 at each pulse, the effect of such pulses in the secondary circuit of transformer T2 is dependent on the secondary load, that is on the impedance of the welding gap. The welding gap impedance can be considered in terms of three discrete values that are a function of gap current. Gap impedance will be extremely high prior to arc current flow; it will assume an intermediate value related to the energy delivered across the welding gap by the secondary of pulse transformer T2; and it will have an extremely low value as the welding current power supply begins to supply arc current. The function of the weld ignitor circuit is to produce an intermediate gap impedance sufficiently low that the welding power supply can deliver arc current.

The polarity of pulse transformer T2 is chosen such that the first voltage pulse is in a direction to add to the welding voltage, that is to waveform 16 supplied by the welding current controller. The ionizing current flow resulting from the first pulse is therefore in the same direction as the welding current. If the first pulse supplied is of sufficient intensity, the intermediate gap impedance will be lowered enough to allow welding current to start. The gap voltage is thereby reduced to about 30 volts and transformer T1 is effectively short circuited. When that happens the second and third current pulses still flow in the primary of transformer T2 but no secondary voltage is generated.

If the gap ionization from the first current pulse is insufficient to ionize the gap and allow the start of welding current, T2 is not effectively short circuited and the second current pulse generates a voltage across the secondary of transformer T2. Gap current flow resulting from the second pulse is in a direction opposite to the weld current and as a result, the probability of weld current initiation from the second pulse is very low. The second pulse does maintain the gap ionization, however, with the end result that the third pulse will initiate the weld current in all cases where the first pulse did not produce sufficient ionization.

The function of winding 28 on transformer T2 is to reset the core from the saturated state after the 3rd pulse in order to be ready for the next cycle of pulsing. One way of so doing is to connect winding 28 through controlled rectifier SCR2 across a portion of secondary winding 22 of transformer T3. The controlled rectifier is gated to allow current flow during the off half-cycle which causes reverse saturation of the core. Gating is through a conventional control circuit represented by the rectangle 29 and labelled gate control.

The fact that the third pulse will initiate the weld current in all cases where the first pulse did not is surprising considering that the third pulse has less than ¼ the energy of the first pulse. It results from the cumulative ionization which the invention achieves by pulsing the gate circuit at a frequency approximating the natural oscillatory frequency of the pulse modulator network (25 kilocycles by way of example) so that there is little time for deionization betweeen pulses. This permits high current gating of the controlled rectifier without thermal overloading of the gate junction, and also reduces the power handling requirements of the pulse transformer. At the same time, welding current flow at each cycle is assured and high degree of reliability of the welds produced by the equipment is achieved.

What we claim as new and desire to secure by Letters Patent of the United States is:

1. A welding circuit comprising a welding current controller including means for regulating alternating current half-waves supplied across a welding gap between a welding electrode and a work piece, and a pulse modulator comprising a capacitor, a pulse transformer having a primary winding and a controlled rectifier connected in a closed loop, means for charging said capacitor, said pulse transformer having a secondary winding connected in series with the output of the welding current controller across the welding gap, a diode connected in parallel with the controlled rectifier but poled to conduct in the opposite direction, and a gating circuit supplying pulses to the controlled rectifier at a frequency approximating the natural oscillatory frequency of the pulse modulator network whereby a series of pulses is produced causing cumulative ionization with little deionization in the time intervals between pulses.

2. A welding circuit as defined in claim 1 wherein the gating circuit comprises a charging capacitor connected in series with a resistance across the output of the current controller, and a diac connecting the charging capacitor across the gate of the controlled rectifier.

3. A welding circuit as defined in claim 2 including a saturating inductance in the closed loop of the pulse modulator.

References Cited

UNITED STATES PATENTS

| | | | |
|---|---|---|---|
| 2,612,582 | 9/1952 | Appleton | 219—131 |
| 2,814,715 | 11/1957 | Blackmer | 219—135 X |
| 3,154,721 | 10/1964 | Sommeria | 219—131 X |
| 3,284,666 | 1/1966 | Hajicek | 219—131 X |

JOSEPH V. TRUHE, Primary Examiner

C. L. ALBRITTON, Assistant Examiner

U.S. Cl. X.R.

219—135